(12) United States Patent
Matyac

(10) Patent No.: US 10,380,869 B1
(45) Date of Patent: Aug. 13, 2019

(54) SURGE PROTECTOR WITH WIRELESS NOTIFICATION

(71) Applicant: Mark Matyac, Lawrenceville, GA (US)

(72) Inventor: Mark Matyac, Lawrenceville, GA (US)

(73) Assignee: North American Power Products, Inc., Lawrenceville, GA (US)

( * ) Notice: Subject to any disclaimer, the term of this patent is extended or adjusted under 35 U.S.C. 154(b) by 0 days.

(21) Appl. No.: 15/968,897

(22) Filed: May 2, 2018

(51) Int. Cl.
*G08B 1/08* (2006.01)
*G08B 21/18* (2006.01)
*H01C 7/12* (2006.01)
*H02H 9/04* (2006.01)

(52) U.S. Cl.
CPC .............. *G08B 21/187* (2013.01); *H01C 7/12* (2013.01); *H02H 9/042* (2013.01)

(58) Field of Classification Search
None
See application file for complete search history.

(56) References Cited

U.S. PATENT DOCUMENTS

| | | | |
|---|---|---|---|
| 5,392,188 A | 2/1995 | Epstein | |
| 5,519,564 A | 5/1996 | Carpenter, Jr. | |
| 6,606,232 B1 | 8/2003 | Vo et al. | |
| 6,778,375 B1 | 8/2004 | Hoopes | |
| 6,900,972 B1 * | 5/2005 | Chan ...................... | H01H 83/04 361/111 |
| 7,961,111 B2 * | 6/2011 | Tinaphong ............. | H02H 9/042 340/638 |
| 2005/0207079 A1 | 9/2005 | Tiller et al. | |
| 2007/0002511 A1 | 1/2007 | Chaudhry | |
| 2008/0167088 A1 | 7/2008 | Rabu et al. | |
| 2009/0146494 A1 * | 6/2009 | Mori ....................... | G06F 1/266 307/38 |
| 2014/0354821 A1 * | 12/2014 | Monroe ................... | H04N 7/18 348/159 |

(Continued)

FOREIGN PATENT DOCUMENTS

WO    WO 99/05761 A1    2/1999

OTHER PUBLICATIONS

Google Patents: "Failure prediction system of surge protection apparatus"; Aug. 21, 2014 (Machine translation of WO 2014/126357A1).

*Primary Examiner* — Julie B Lieu
(74) *Attorney, Agent, or Firm* — Bryan W. Bockhop; Bockhop Intellectual Property Law, LLC

(57) ABSTRACT

A system for indicating a service need for a surge protector includes a surge protection component. The surge protection component conducts electrical power from the power source to a load when the electrical power has a voltage that is less than a predetermined threshold. The surge protection component also diverts electrical power from the load when the electrical power has a voltage that is greater than the predetermined threshold, the system. The system includes a personal area network chipset. A control circuit is communicatively coupled to the personal area network chipset. The control circuit enters a first alarm state when the surge protection component has reached an expiration date. The control circuit causes the personal area network chipset to generate a wireless alert signal indicating that the surge protection component should be replaced upon the control circuit entering the first alarm state.

11 Claims, 2 Drawing Sheets

(56) References Cited

U.S. PATENT DOCUMENTS

2018/0088155 A1* 3/2018 Clarke .................. G01N 25/04
2018/0108461 A1* 4/2018 Rostron ................ G01J 5/0096
2018/0112837 A1* 4/2018 Sadwick ................. F21K 9/27

* cited by examiner

US 10,380,869 B1

SURGE PROTECTOR WITH WIRELESS NOTIFICATION

BACKGROUND OF THE INVENTION

1. Field of the Invention

The present invention relates to surge protectors and, more specifically, to a surge protector that reports significant events via a local area network.

2. Description of the Related Art

Surge protectors protect electrical equipment from voltage spikes, which can result from transients on a power supply line, lightning strikes and similar events. Surge protectors typically limit the voltage supplied to an electric device by shunting power having a voltage greater than a threshold to ground.

One common type of surge protector employs a varistor, such as a metal oxide varistor (MOV), to divert power from each line of a power source to ground when the voltage between the line and ground goes above a predetermined threshold. Some surge protectors also employ a gas discharge tube (GDT) in diverting power. MOVs and GDTs tend to have a finite life expectancy and degrade when exposed to certain environmental conditions and frequent large power transients.

When an MOV degrades it can result in a permanent short circuit and when a GDT degrades, it can fail to divert power when surges occur. In either situation, valuable electrical equipment can be subject to damage during power transients. MOVs have a finite life expectancy and they degrade when they are exposed to voltage transients. The triggering voltage of an MOV falls lower and lower as the MOV degrades. An MOV's ultimate failure mode is, thus, a short circuit that results in loss of surge protection. Degradation of a GDT results in an increase in the device's triggering voltage. The failure mode for a GDT occurs when the triggering voltage rises so high that the device becomes ineffective.

Most large scale surge protectors employ timers and self-test circuits to generate warnings indicating that an MOV or GDT in the surge protector should be replaced. Typical, household and industrial surge protectors include a light emitting diode (LED) warning light to indicate that an MOV or GDT should be replaced. Unfortunately, many end users, such as homeowners, do not check the warning light on their surge protectors regularly (if at all). As a result, expired or degraded MOVs and degraded GDTs can remain in place for long periods, which can increase the likelihood of damage to electrical equipment during power transients.

Therefore, there is a need for a surge protector that remotely notifies a user of the need to replace expired or degraded components.

SUMMARY OF THE INVENTION

The disadvantages of the prior art are overcome by the present invention which, in one aspect, is a system for indicating a service need for a surge protector that includes a surge protection component having a first port for connection to the power source and a second port for connection to the load. The surge protection component is configured to conduct electrical power from the power source to the load when the electrical power has a voltage that is less than a predetermined threshold. The surge protection component is also configured to divert electrical power from the load when the electrical power has a voltage that is greater than the predetermined threshold, the system. The system includes a personal area network chipset. A control circuit is communicatively coupled to the personal area network chipset. The control circuit is configured to enter a first alarm state when the surge protection component has reached an expiration date. The control circuit causes the personal area network chipset to generate a wireless alert signal indicating that the surge protection component should be replaced upon the control circuit entering the first alarm state.

In another aspect, the invention is a surge protector for protecting a load from surges in electrical power from a power source. The surge protector includes a surge protection component that has a first port for connection to the power source and a second port for connection to the load. The surge protection component conducts electrical power from the power source to the load when the electrical power has a voltage that is less than a predetermined threshold. The surge protection component also diverts electrical power from the load when the electrical power has a voltage that is greater than the predetermined threshold. The surge protector also includes a personal area network chipset and a functionality sensor that asserts a status signal that indicates whether the surge protection component is functioning properly. A control circuit is responsive to the status signal and is communicatively coupled to the personal area network chipset. The control circuit enters a first alarm state when the surge protection component has reached an expiration date and enters a second alarm state when the surge protection component is not functioning properly based on the status signal. The control circuit causes the personal area network chipset to generate a wireless alert signal indicating that the surge protection component should be replaced upon the control circuit entering at least one of the first alarm state and the second alarm state. A mobile wireless device receives the wireless alert signal and generates a user-perceivable indication that the surge protection component should be replaced.

In yet another aspect, the invention is a method for providing information about a surge protector component, in which it is determine when the surge protector component has passed an expiration date. A wireless alert signal is generated when the surge protector component has passed an expiration date or when the surge protector component is not functioning properly.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
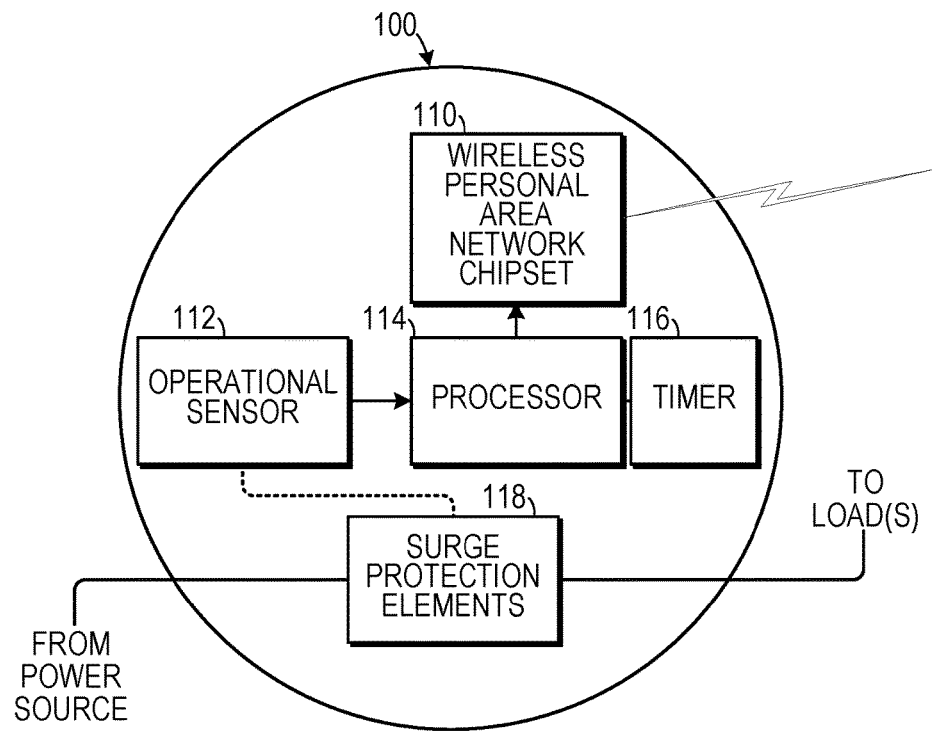
FIG. 1 is a schematic diagram of one embodiment of a surge protector with wireless notification capability.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

As shown in FIG. 1, one embodiment of a surge protection system 100 includes one or more surge protector elements 118 (which can include MOVs, GDTs, other types of surge protector elements and combinations thereof) that electrically couple a power source (such as utility power) to one or more loads (such as household/office electronics and appliances, etc.) and that protect the loads from voltage surges in the power from the power source. An operational sensor 112 (such as a continuity sensor) determines if the surge protector elements 118 are operating properly. A processor 114 (such as a microprocessor or other type of control circuit) receives an input from the operational sensor 112 and also from a timer 116 (which is shown as a separate element in FIG. 1, but which could be a timer internal to the processor 114) and communicates with a wireless personal area network chipset 110 (such as a Bluetooth® chipset). The timer 116 indicates if the surge protector elements 118 have reached a recommended replacement date and the operational sensor 112 indicates if the surge protector elements 118 are working properly. If the surge protector elements 118 have either reached their replacement date or are not working properly, then the processor 114 enters an alarm state that causes the wireless personal area network chipset 110 to generate a wireless signal indicating that the surge protector elements 118 require attention.

Figure 2:
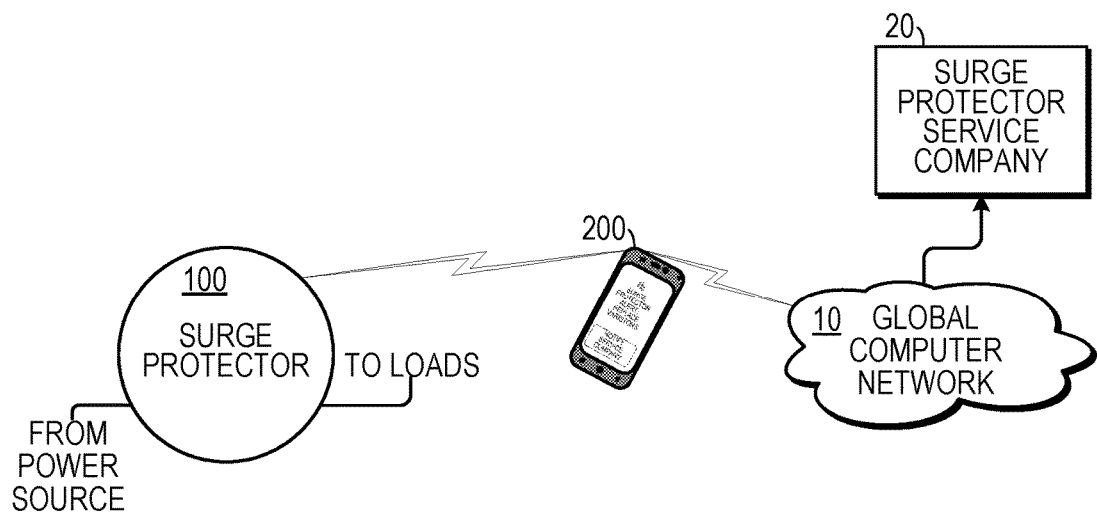
FIG. 2 is a schematic diagram of one embodiment of a cellular telephone receiving a component replacement warning

As shown in FIG. 2, the wireless signal from the surge protection system 100 can be received by a cellular telephone 200 to notify a user that the surge protector elements 118 require attention. The cellular telephone 200 can communicate with a service company 20 via a cellular network and the global computer network 10. This can either be done at the user's discretion or automatically.

Figure 3:
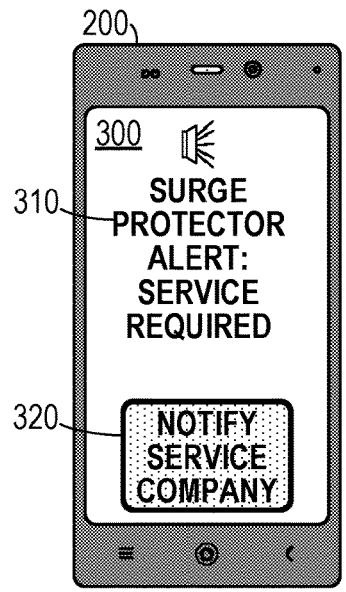
FIG. 3 is a schematic diagram of one embodiment of a system for FIG. 4 is a flow diagram demonstrating one representative mode of operating a surge protector with wireless notification capability.

As shown in FIG. 3, the cellular telephone 200 (or other type of mobile wireless device, such as a tablet, a laptop, or a dedicated wireless device, etc.) can run an app 300 that generates both an audible alarm and a visual indication 310 of the need for attention. The app 300 can also include a virtual button 320 that, if activated by the user, would cause a notification to be sent to the service company 20 indicating that the surge protection system 100 requires service. The notification could indicate the serial number of the surge protection system 100 and any other relevant information, which could include the nature of the service required and even an identification of specific elements that need replacement. The service company 20 would then use such information to identify the location of the surge protection system 100 requiring attention and, based thereon, could assign a technician to make a service call.

Figure 4:
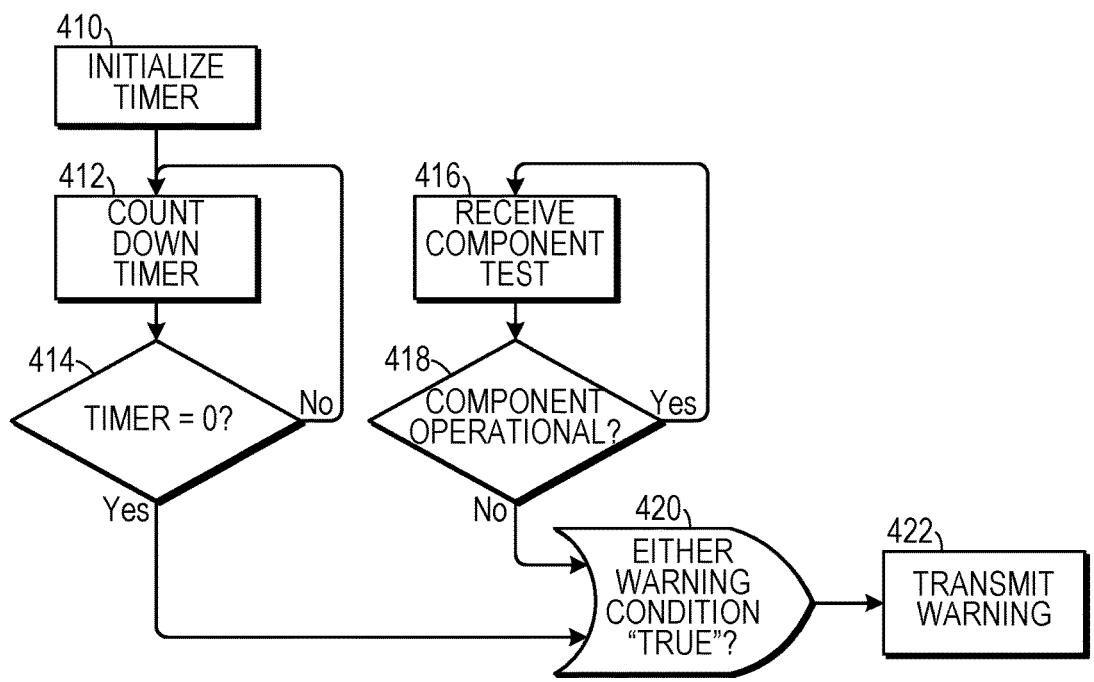

As shown in FIG. 4, the processor 114 can be programmed to execute the following steps. Upon instillation of the surge protector elements 118, the timer is initialized 410 with the amount of time until the elements require replacement and the timer continuously counts down periodically 412 until the timer reaches zero 414. (While a count-down timer is shown, it will be understood that any timing mechanism can be used, such as a count-up timer, a date checking mechanism and the like.) Also, the processor continuously monitors 416 the operational sensor and tests 418 to determine if the surge protector elements 118 are operational. If the surge protector elements 118 are either non-operational or have reached their replacement date 420 then the processor generates a warning 422 modulated onto a wireless signal for transmission by the wireless personal area network chipset 110.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for indicating a service need for a surge protector that includes a surge protection component having a first port for connection to the power source and a second port for connection to the load, the surge protection component configured to conduct electrical power from the power source to the load when the electrical power has a voltage that is less than a predetermined threshold and configured to divert electrical power from the load when the electrical power has a voltage that is greater than the predetermined threshold, the system comprising:
   (a) a personal area network chipset; and
   (b) a control circuit that is communicatively coupled to the personal area network chipset, the control circuit being configured to enter a first alarm state when the surge protection component has reached an expiration date, the control circuit configured to cause the personal area network chipset to generate a wireless alert signal indicating that the surge protection component should be replaced upon the control circuit entering the first alarm state;
   (c) a mobile wireless device configured to:
      (i) receive the wireless alert signal; and
      (ii) generate a user-perceivable indication that the surge protection component should be replaced,
   wherein the mobile wireless device is further configured to send a service company an identification of the surge protector and an indication that surge protection component requires service upon receipt of the wireless alert signal.

2. The system of claim 1, further comprising a functionality sensor configured to assert an alarm signal when the surge protection component is not functioning properly wherein the control circuit is configured to cause the personal area network chipset to generate the wireless alert signal when the functionality sensor asserts the alarm signal.

3. The system of claim 1, wherein the surge protection component includes at least one metal-oxide varistor.

4. The system of claim 3, wherein the control circuit comprises a microprocessor.

5. The system of claim 1, wherein the identification of the surge protector comprises a serial number.

6. A method for providing information about a surge protector component, comprising the steps of:
   (a) determining when the surge protector component has passed an expiration date; and
   (b) generating a wireless alert signal when the surge protector component has passed an expiration date or when the surge protector component is not functioning properly;
   (c) receiving the wireless alert signal on a wireless mobile device having a display screen and generating a visually perceptible alert corresponding thereto on the display screen;
   (d) generating a virtual button presented on the display that provides a user an option of sending a notification to a service company indicating that the surge protector component requires servicing; and
   (e) upon receiving an input corresponding to selection of the virtual button, transmitting the notification to the service company.

7. The method of claim 6, further comprising the steps of:
   (a) determining when the surge protector component is not functioning properly; and
   (b) generating the wireless alert signal when the surge protector component is not functioning properly.

8. The method of claim 6, wherein the notification to the service company includes a serial number of the surge protector.

9. The method of claim 6, wherein the step of generating a wireless alert signal comprises the steps of:
   (a) generating a digital alert signal with a control circuit; and
   (b) modulating the digital alert signal into the wireless alert signal using a local area network chipset.

10. A method for providing information about a surge protector component, comprising the steps of:
    (a) determining, by a control circuit, when the surge protector component has passed an expiration date;
    (b) generating a wireless alert signal, by a control circuit, when the surge protector component has passed an expiration date or when the surge protector component is not functioning properly;
    (c) transmitting, by the control circuit, the wireless signal to a mobile wireless device; and
    (d) transmitting, by the mobile wireless device, the wireless alert signal identifying the surge protector component to a service company upon execution the step of generating a wireless alert signal.

11. The method of claim 10, wherein the notification to the service company includes a serial number of the surge protector.

* * * * *